(12) United States Patent
Dai et al.

(10) Patent No.: US 11,505,684 B2
(45) Date of Patent: Nov. 22, 2022

(54) VEHICLE TIRE RUBBER COMPOSITE MATERIAL

(71) Applicants: Xiamen University, Fujian (CN); Cheng Shin Tire (Xiamen) Co., Ltd., Xiamen (CN)

(72) Inventors: Lizong Dai, Fujian (CN); Jing Hong, Fujian (CN); Hesheng Cao, Xiamen (CN); Guorong Chen, Fujian (CN); Weiang Luo, Fujian (CN); Conghui Yuan, Fujian (CN); Birong Zeng, Fujian (CN); Yiting Xu, Fujian (CN)

(73) Assignees: Xiamen University, Fujian (CN); Cheng Shin Tire (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 17/666,875

(22) Filed: Feb. 8, 2022

(65) Prior Publication Data

US 2022/0251345 A1    Aug. 11, 2022

(30) Foreign Application Priority Data

Feb. 8, 2021 (CN) .......................... 202110186378.5

(51) Int. Cl.
  *B60C 1/00* (2006.01)
  *C08L 7/00* (2006.01)
  *C08L 9/00* (2006.01)

(52) U.S. Cl.
  CPC ................ *C08L 9/00* (2013.01); *B60C 1/00* (2013.01); *C08L 7/00* (2013.01); *C08L 2201/02* (2013.01); *C08L 2205/035* (2013.01)

(58) Field of Classification Search
  CPC ..................................... B60C 1/00; C08L 7/00
  USPC .......................................................... 524/447
  See application file for complete search history.

(56) References Cited

FOREIGN PATENT DOCUMENTS

| CN | 105837872 A | 8/2016 |
|---|---|---|
| CN | 106832448 A | 6/2017 |
| GB | 1395780 | * 12/1972 |
| GB | 1395780 A | 5/1975 |

* cited by examiner

*Primary Examiner* — Deve V Hall
(74) *Attorney, Agent, or Firm* — Cooper Legal Group LLC

(57) ABSTRACT

A vehicle tire rubber composite material, raw materials of the vehicle tire rubber composite material comprise the following components by weight: 30-40 weight distributions of solution-polymerized styrene-butadiene rubber, 35-55 weight distributions of rare earth butadiene rubber, 10-30 weight distributions of phenyl modified natural rubber, 5-14 weight distributions of polyurethane elastomer, 3-9 weight distributions of acetylene carbon black, 2-5 weight distributions of multifunctional abrasion-resistant flame retardant Cu@HNT@MoS$_2$-PZE, 3-6 weight distributions of elastic fiber, 1-3 weight distributions of heat stabilizer, 2-3 weight distributions of silane coupling agent, 1-2.5 weight distributions of anti-scorching agent, 1-2.5 weight distributions of turpentine oil, and 4-6 weight distributions of accelerator.

10 Claims, 1 Drawing Sheet

VEHICLE TIRE RUBBER COMPOSITE MATERIAL

RELATED APPLICATIONS

This application claims priority to Chinese patent application 202110186378.5, filed on Feb. 8, 2021. Chinese patent application 202110186378.5 is incorporated herein by reference.

FIELD OF THE DISCLOSURE

The present disclosure relates to a technical field of composite materials, and in particular relates to a low-energy consumption, multifunctional, flame-retardant vehicle tire rubber composite material.

BACKGROUND OF THE DISCLOSURE

Rubber products are widely used, and a consumption of rubber products is large. According to data from the Malaysian Rubber Export Promotion Council (MREPC), global rubber production increased to 26.9 million tons in 2016. The International Rubber Research Organization (IRSG) also predicts that from 2017 to 2025, total rubber consumption will grow at an average annual rate of 2.8%. In the vehicle field, with the development of the vehicle industry, the modification of natural rubber and the development of energy-saving or low-energy consumption, abrasion-resistant rubber composite materials have great significance to increase its service life and reduce energy consumption and costs during its use. At the same time, rubber is also a flammable material, and it is also an urgent requirement for vehicle tires to have flame retardant properties. In the production of rubber products, a large amount of consumption has also resulted in a large amount of waste. However, the cross-linked structure in the rubber makes it difficult to degrade naturally, causing a certain amount of pollution. Tire pyrolysis is one of the feasible methods to treat rubber waste and realize resource utilization.

BRIEF SUMMARY OF THE DISCLOSURE

An objective of the present disclosure is to overcome deficiencies of existing techniques and to provide a low-energy consumption, multifunctional, and flame-retardant vehicle tire rubber composite material.

A technical solution of the present disclosure is as follows.

A vehicle tire rubber composite material, raw materials of the vehicle tire rubber composite material comprise the following components by weight: 30-40 weight distributions of solution-polymerized styrene-butadiene rubber, 35-55 weight distributions of rare earth butadiene rubber, 10-30 weight distributions of phenyl modified natural rubber, 5-14 weight distributions of polyurethane elastomer, 3-9 weight distributions of acetylene carbon black, 2-5 weight distributions of multifunctional abrasion-resistant flame retardant Cu@HNT@MoS$_2$-PZE, 3-6 weight distributions of elastic fiber, 1-3 weight distributions of heat stabilizer, 2-3 weight distributions of silane coupling agent, 1-2.5 weight distributions of anti-scorching agent, 1-2.5 weight distributions of turpentine oil, and 4-6 weight distributions of accelerator;

raw materials of the phenyl modified natural rubber comprise N-bromosuccinimide, natural rubber, methylene dichloride, methanol, tetrahydrofuran, potassium hydroxide, phenylboronic acid, and palladium catalyst; and raw materials of the multifunctional abrasion-resistant flame retardant Cu@HNT@MoS$_2$-PZE comprise halloysite nanotubes, CuSO$_4$·5H$_2$O, Na$_3$C$_6$H$_5$O$_7$·2H$_2$O, hydrazine hydrate, Na$_2$MoO$_4$·2H$_2$O, L-cysteine, eugenol, anhydrous potassium carbonate, and phosphonitrilic chloride trimer.

In a preferred embodiment, a method for preparing the phenyl modified natural rubber comprises the following steps:

(1) dissolving the natural rubber in the methylene dichloride, stirring for 1-3 hours under a nitrogen atmosphere at 29-31° C., then adding the N-bromosuccinimide, continually stirring at 29-31° C. for 2-4 hours, then adding the methanol to coagulate a first product, and drying under reduced pressure (i.e., pressure less than 1 atm (atmospheric pressure)) to obtain a brominated natural rubber; and (2) dissolving the brominated natural rubber in the tetrahydrofuran, stirring for 1-3 hours under a nitrogen atmosphere at room temperature, then adding the phenylboronic acid or p-tolylboronic acid and adding an aqueous solution of the potassium hydroxide and the palladium catalyst, refluxing and reacting 5-10 hours, adding the methanol to coagulate a second product, and then drying under reduced pressure to obtain the phenyl modified natural rubber.

In a preferred embodiment, a mass ratio of the natural rubber, the methylene dichloride, and the N-bromosuccinimide in the step (1) is 1-5: 95-100: 2-6.

In a preferred embodiment, a mass ratio of the brominated natural rubber, the tetrahydrofuran, the phenylboronic acid or the p-tolylboronic acid, the potassium hydroxide, and the palladium catalyst in the step (2) is 1-4: 95-100: 0.1-0.5: 6-10: 0.006-0.01.

In a preferred embodiment, a method for preparing the multifunctional abrasion-resistant flame retardant Cu@HNT@MoS$_2$-PZE comprises the following steps:

(1) dissolving the halloysite nanotubes and the CuSO$_4$·5H2O in a mixed solvent consisting of ethanol and water (e.g., ultrapure water) with a volume ratio of 20-40: 2-10, then slowly dripping Na$_3$C$_6$H$_5$O$_7$·2H$_2$O aqueous solution to obtain a solution (e.g., a light blue solution), continually sonicating for 2-3 hours, then adding the hydrazine hydrate, reducing at 75-85° C. for 1-2 hours, centrifuging, washing, and drying to obtain Cu@HNT;

(2) sonicating to disperse the Cu@HNT and the Na$_2$MoO$_4$·2H$_2$O in distilled water, then adding the L-cysteine while stirring, then reacting at 180-200° C. for 36-48 hours, centrifuging, washing, and drying to obtain Cu@HNT@MoS$_2$; and (3) adding the Cu@HNT@MoS$_2$ and the eugenol into dried acetonitrile solvent, adding the anhydrous potassium carbonate, stirring, then slowly dripping an acetonitrile solution of the phosphonitrilic chloride trimer under nitrogen atmosphere, and reacting at 80-85° C. for 36-72 hours to obtain the multifunctional abrasion-resistant flame retardant Cu@HNT@MoS$_2$-PZE.

In a preferred embodiment, a ratio of the halloysite nanotubes, the CuSO$_4$·5H$_2$O, the Na$_3$C$_6$H$_5$O$_7$·2H$_2$O, and the hydrazine hydrate in the step (1) is 60 mg-120 mg: 10 mg-30 mg: 70 mg-100 mg: 2 mL-4 mL.

In a preferred embodiment, a mass ratio of the Cu@HNT, the Na$_2$MoO$_4$·2H$_2$O, and the L-cysteine in the step (2) is 0.1-0.3: 0.5-0.9: 2-4.

In a preferred embodiment, a mass ratio of the Cu@HNT@MoS$_2$, the eugenol, and the anhydrous potassium carbonate in the step (3) is 1-3: 3-5: 2-5.

In a preferred embodiment, the elastic fiber is at least one of elastic polyethylene fiber (e.g., highly elastic polyethylene fiber), silk, or polyurethane fiber.

A vehicle tire, wherein the vehicle tire is made of raw materials comprising the vehicle tire rubber composite material.

The present disclosure has the following advantages.

1. The present disclosure has good flame retardancy, abrasion resistance, long service life, good toughness, and high strength. After the rubber is recycled, an easy catalytic treatment of the rubber in a thermal degradation process is also considered, and the rubber can be widely used in bicycle tires and other abrasion-resistant flame retardant rubber products.

2. The present disclosure performed phenyl modification based on the natural rubber to form a new green material with phenyl groups and main chain molecules. A glass transition temperature of the new green material can be effectively increased, and a prominent viscoelastic material is effectively obtained. In a method for preparing tire rubber materials, the new green material is combined with solution-polymerized styrene-butadiene rubber, rare earth butadiene rubber, and polyurethane elastomer, and the tire rubber materials have better uniformity and abrasion resistance than conventional rubber tires, and no tire surface detachment is found.

3. The multifunctional abrasion-resistant flame retardant Cu@HNT@MoS$_2$-PZE prepared in Embodiment 2 of the present disclosure can not only improve flame retardancy performance of the vehicle tire, but also improve the abrasion resistance of the vehicle tire. Use performance of rubber products can be ensured, and the service life is prolonged. At the same time, in a process for preparing the rubber tire, a recycling disposal after consumption is also considered. Introduced transition metal copper modified halloysite nanotubes have a certain catalytic effect during a pyrolysis process of vulcanized rubber, a quality of the rubber is improved, and at the same time, a sulfur content in a pyrolysis oil is reduced. The reason is as follows: a crystallization of the transition metal copper forms strong acid sites, which has a better removal effect on sulfur-containing components during the pyrolysis process and can react with sulfur in pyrolysis volatiles to generate stable CuS to achieve devulcanization. Molybdenum disulfide is usually used as a solid lubricant and is usually widely used in abrasion-resistant materials. Molybdenum disulfide has a modulation structure having S—Mo—S interlayer, and a Van der Waals bond between the S—Mo—S interlayers is weak, easily generating a low friction coefficient and low abrasion due to a slip shear stress of the S—Mo—S interlayers. After a coating of inorganic molybdenum disulfide, an interface compatibility with the rubber matrix is poor and agglomeration is likely to occur, which leads to a decrease in mechanical properties of the composite material. Therefore, the composite material is further organically modified. The composite material Cu@HNT@MoS$_2$ is organically modified, the flame retardant elements P, N are introduced, at the same time, the active functional group carbon-carbon double bonds are also introduced to obtain the multifunctional abrasion-resistant flame retardant Cu@HNT@MoS$_2$-PZE. While the flame retardant performance is improved, a presence of the carbon-carbon double bonds can also promote participation of the carbon-carbon double bonds in the vulcanization preparation of rubber, thereby improving the overall performance of the rubber.

DETAILED DESCRIPTION OF THE EMBODIMENTS

The technical solution of the present disclosure will be further described as follows in combination with the accompanying embodiments and drawings.

Embodiment 1

Figure 1:
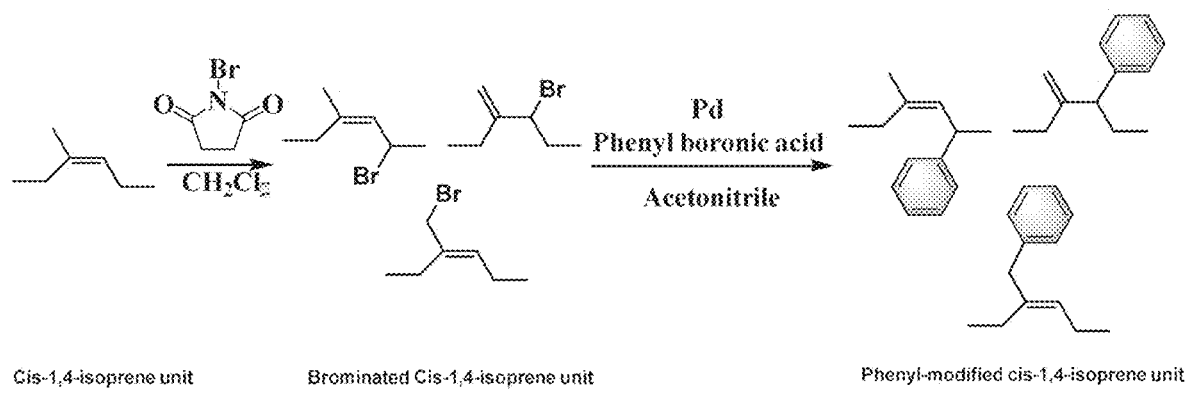
FIG. 1 is a reaction formula for preparing a phenyl modified natural rubber of Embodiment 1 of the present disclosure.

Referring to FIG. 1, a method for preparing phenyl modified natural rubber comprises the following steps:

(1) 2 g of natural rubber is dissolved in 98 g of methylene dichloride and stirred at 30° C. under nitrogen atmosphere for 1 hour, 2.62 g of N-bromosuccinimide is then added and continually stirred at 30° C. for 3 hours, a proper amount of methanol is then added to coagulate a first product, and then the first product is then dried under reduced pressure (i.e., pressure less than 1 atm (atmospheric pressure)) at 30° C. to obtain a brominated natural rubber;

(2) 1.66 g of the brominated natural rubber is dissolved in 98 g of tetrahydrofuran and stirred for 1 hour under a nitrogen atmosphere at room temperature (e.g., 20° C.-30° C.), 0.4 g of phenylboronic acid or p-tolylboronic acid and an aqueous solution dissolving 0.25 g potassium hydroxide and 8.65 mg palladium catalyst are added and refluxed for 6 hours, an appropriate amount of methanol is then added to coagulate a second product, and the second product is then dried under reduced pressure at 50° C. to obtain the phenyl modified natural rubber.

In this embodiment, a glass-transition temperature Tg of the natural rubber is −62.1° C., and a glass-transition temperature Tg of the phenyl modified natural rubber is −32.0° C., wherein a corresponding phenyl content is about 9.31 mol %.

Embodiment 2

Figure 2:
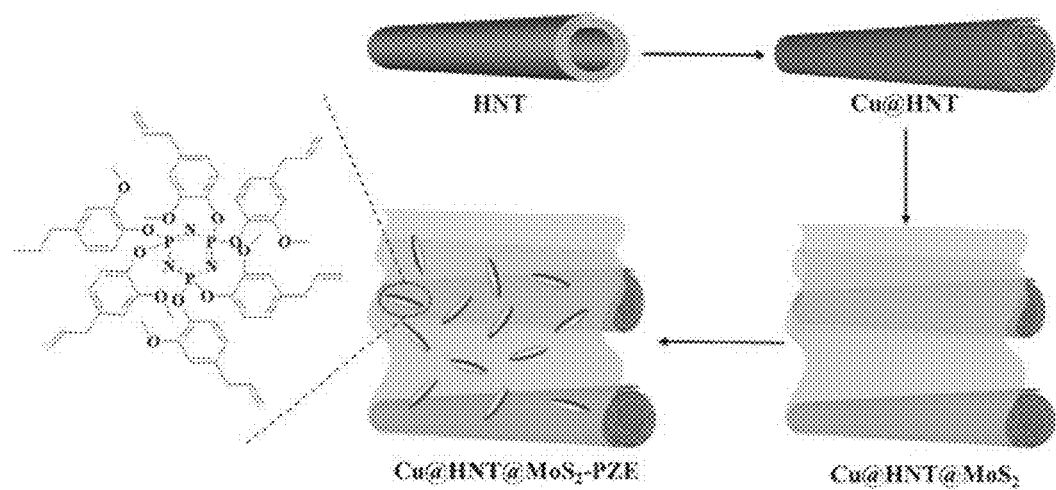
FIG. 2 is a production flow chart of a multifunctional abrasion-resistant flame retardant Cu@ HNT@MoS$_2$-PZE of Embodiment 2 of the present disclosure.
Figure 3:
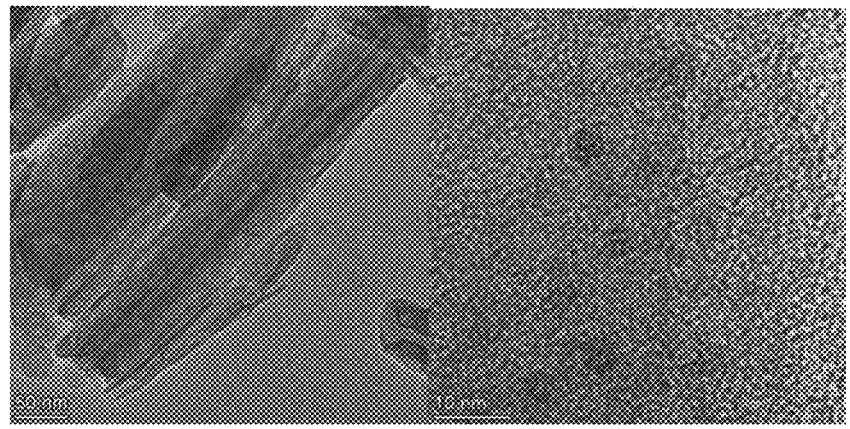
FIG. 3 is a transmission electron microscope image of Cu@HNT of Embodiment 2 of the present disclosure.

Referring to FIG. 2, a method for preparing a multifunctional abrasion-resistant flame retardant Cu@HNT@MoS$_2$-PZE comprises the following steps:

(1) 60 mg of halloysite nanotubes and 30 mg of CuSO$_4$·5H$_2$O are dispersed and dissolved in a mixed solvent consisting of ethanol and ultrapure water with a volume ratio of 20 mL:5 mL and stirred for 15 minutes, Na$_3$C$_6$H$_5$O$_7$·2H$_2$O aqueous solution is then slowly dripped (90.8 mg, 5 mL) to obtain a light blue solution, the light blue solution is continually sonicated for 2 hours, hydrazine hydrate is then added, reduced at 85° C. for 1 hour, centrifuged, washed, and dried to obtain Cu@HNT as shown in FIG. 3;

(2) 0.1 g of the Cu@HNT and 0.5 g of Na$_2$MoO$_4$·2H$_2$O are sonicated to be dispersed in 140 mL of distilled water, 2 g of L-cysteine is then added while stirring, then placed in a reaction kettle at 180° C. for 36 hours, centrifuged, washed, and dried to obtain Cu@HNT@MoS$_2$;

(3) 1 g of the Cu@HNT@MoS$_2$ and 5 g of eugenol are added into a dried acetonitrile solvent, 4.7 g of anhydrous potassium carbonate is added and stirred, 1.2 g/90 mL of an acetonitrile solution of phosphonitrilic chloride trimer is then slowly dripped under nitrogen atmosphere and reacted at 85° C. for 48 hours to obtain the multifunctional abrasion-resistant flame retardant Cu@HNT@MoS$_2$-PZE.

Embodiment 3

Raw materials of a low energy consumption, multifunctional, flame-retardant vehicle tire rubber composite material comprises the following components by weight: 30 weight distributions of solution-polymerized styrene-butadiene rubber, 35 weight distributions of rare earth butadiene rubber, and 13 weight distributions of the phenyl modified natural rubber prepared in Embodiment 1, 5 weight distributions of polyurethane elastomer, 3 weight distributions of acetylene carbon black, 2 weight distributions of the multifunctional abrasion-resistant flame retardant Cu@HNT@MoS$_2$-PZE prepared in Embodiment 2, 3 weight distributions of highly elastic polyethylene fiber, 1 weight distribution of heat stabilizer (HS-80), 2 weight distributions of silane coupling agent (Si 69), 1 weight distribution of anti-scorching agent (CTP), 1 weight distribution of turpentine oil, and 4 weight distributions of accelerator (CZ).

A method for preparing the low energy consumption, multifunctional, and flame-retardant vehicle tire rubber composite material of this embodiment comprises the following steps:

(1) The solution-polymerized styrene-butadiene rubber, the rare earth butadiene rubber, and the phenyl modified natural rubber prepared in Embodiment 1 are added into an internal mixer, a rotor revolution speed of the internal mixer is 60 rpm (revolutions per minute), and a mixing time is 40-60 seconds. The polyurethane elastomer, the acetylene carbon black, the high-elastic polyethylene fiber, the heat stabilizer (HS-80), the anti-scorching agent, and the turpentine oil are added and continually mixed for 150-200 seconds, a rubber discharging temperature is 140-160° C., a first sheet is discharged and cooled to obtain a first-stage rubber compound, and the first-stage rubber compound is rested for 10 hours for later use;

(2) The first-stage rubber compound and the multifunctional abrasion-resistant flame retardant Cu@HNT@MoS$_2$-PZE prepared in Embodiment 2 are added into an internal mixer and mixed for 150-200 seconds with a rotor revolution speed of 60 rpm, a rubber discharging temperature 140-160° C., a second sheet is discharged and cooled to obtain a second-stage rubber compound, and the second-stage rubber compound placed for 10 hours for later use;

(3) The second-stage rubber compound, sulfur, and the accelerator (CZ) are added into an internal mixer and mixed for 100-140 seconds, a rubber discharging temperature of 90-120° C., a third sheet is discharged and cooled to obtain a third-stage rubber compound, and the third-stage rubber compound placed for 10 hours for use. The third-stage rubber compound is a low energy consumption, multifunctional, flame-retardant vehicle tire rubber composite material.

Embodiment 4

A raw material of a low-energy consumption, multifunctional, flame-retardant vehicle tire rubber composite material comprises the following components by weight: 32 weight distributions of solution-polymerized styrene-butadiene rubber, 35 weight distributions of rare earth butadiene rubber, 10 weight distributions of the phenyl modified natural rubber prepared in Embodiment 1, 5 weight distributions of polyurethane elastomer, 3 weight distributions of acetylene carbon black, 3 weight distributions of the multifunctional abrasion-resistant flame retardant Cu@HNT@MoS$_2$-PZE prepared in Embodiment 2, 2 weight distributions of highly elastic polyethylene fiber, 2 weight distributions of heat stabilizer (HS-80), 2 weight distributions of silane coupling agent (Si 69), 1 weight distribution of anti-scorching agent (CTP), 1 weight distribution of turpentine oil, and 4 weight distributions of accelerator (CZ).

A method for preparing the low-energy consumption, multifunctional, flame-retardant vehicle tire rubber composite material of this embodiment is the same as Embodiment 3.

Embodiment 5

A raw material of a low-energy consumption, multifunctional, flame-retardant vehicle tire rubber composite material comprises the following components by weight: 30 weight distributions of solution-polymerized styrene-butadiene rubber, 35 weight distributions of rare earth butadiene rubber, 12 weight distributions of the phenyl modified natural rubber prepared in Embodiment 1, 4 weight distributions of polyurethane elastomer, 4 weight distributions of acetylene carbon black, 4 weight distributions of the multifunctional abrasion-resistant flame retardant Cu@HNT@MoS$_2$-PZE prepared in Embodiment 2, 2 weight distributions of highly elastic polyethylene fiber, 1 weight distribution of heat stabilizer (HS-80), 2 weight distributions of silane coupling agent (Si 69), 2 weight distributions of anti-scorching agent (CTP), 1 weight distribution of turpentine oil, and 3 weight distributions of accelerator (CZ).

A method for preparing the low-energy consumption, multifunctional, flame-retardant vehicle tire rubber composite material of this embodiment is the same as Embodiment 3.

Control Example 1

30.2 weight distributions of solution-polymerized styrene-butadiene rubber, 35.2 weight distributions of rare earth butadiene rubber, 13.2 weight distributions of phenyl modified natural rubber prepared in Embodiment 1, 5.2 weight distributions of polyurethane elastomer, 3.2 weight distributions of acetylene carbon black, 3.2 weight distributions of highly elastic polyethylene fiber, 1.2 weight distributions of heat stabilizer (HS-80), 2.2 weight distributions of silane coupling agent (Si 69), 1.2 weight distributions of anti-scorching agent (CTP), 1.2 weight distributions of turpentine oil, and 4.2 weight distributions of accelerator (CZ).

A method for preparing a low-energy consumption, multifunctional, flame-retardant vehicle tire rubber composite material of this embodiment is the same as Embodiment 3.

Control Example 2

31.2 weight distributions of solution-polymerized styrene-butadiene rubber, 36.2 weight distributions of rare earth butadiene rubber, 6.2 weight distributions of polyurethane elastomer, 4.2 weight distributions of acetylene carbon black, 3.2 weight distributions of the multifunctional abrasion-resistant flame retardant Cu@HNT@MoS$_2$-PZE prepared in Embodiment 2, 4.2 weight distributions of highly elastic polyethylene fiber, 2.2 weight distributions of heat stabilizer (HS-80), 3.2 weight distributions of silane coupling agent (Si 69), 2.2 weight distributions of anti-scorching agent (CTP), 2.2 weight distributions of turpentine oil, and 5.2 weight distributions of accelerator (CZ).

A method for a low-energy consumption, multifunctional, flame-retardant vehicle tire rubber composite material of this embodiment is the same as Embodiment 3.

The detection data of the foregoing Embodiments 3-5 and Control examples 1 and 2 are shown in the following table:

| Performance | Embodiment 3 | Embodiment 4 | Embodiment 5 | Control example 1 | Control example 2 | Technical requirements |
|---|---|---|---|---|---|---|
| Tensile strength, MPa | 24.9 | 24.2 | 23.7 | 23.5 | 22.8 | ≥18 |
| Elongation at breakage, % | 526 | 530 | 533 | 521 | 519 | ≥400 |
| Abrasion loss, $mm^3$ | 45 | 44 | 42 | 47 | 46 | ≤200 |
| Flame/non-flame burning average value (alcohol blow torch), seconds | 1.2 | 1.1 | 1.0 | 1.5 | 1.3 | ≤3 |

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A multifunctional flame-retardant vehicle tire rubber composite material, wherein:
    raw materials of the multifunctional flame-retardant vehicle tire rubber composite material comprise the following components: solution-polymerized styrene-butadiene rubber, rare earth butadiene rubber, phenyl modified natural rubber, polyurethane elastomer, acetylene carbon black, multifunctional abrasion-resistant flame retardant comprising copper modified halloysite nanotubes coated with polyphosphazenes (PZE) modified $MoS_2$ elastic fiber, heat stabilizer, silane coupling agent, anti-scorching agent, turpentine oil, and accelerator, wherein a weight ratio of the solution-polymerized styrene-butadiene rubber, the rare earth butadiene rubber, the phenyl modified natural rubber, the polyurethane elastomer, the acetylene carbon black, the multifunctional abrasion-resistant flame retardant comprising the copper modified halloysite nanotubes coated with PZE modified $MoS_2$, the elastic fiber, the heat stabilizer, the silane coupling agent, the anti-scorching agent, the turpentine oil, and the accelerator is 30-40: 35-55: 10-30: 5-14: 3-9: 2-5: 3-6: 1-3: 2-3: 1-2.5: 1-2.5:4-6;
    raw materials of the phenyl modified natural rubber comprise N-bromosuccinimide, natural rubber, methylene dichloride, methanol, tetrahydrofuran, potassium hydroxide, phenylboronic acid, and palladium catalyst; and
    raw materials of the multifunctional abrasion-resistant flame retardant comprising the copper modified halloysite nanotubes coated with PZE modified $MoS_2$ comprise halloysite nanotubes, $CuSO_4 \cdot 5H_2O$, $Na_3C_6H_5O_7 \cdot 2H_2O$, hydrazine hydrate, $Na_2MoO_4 \cdot 2H_2O$, L-cysteine, eugenol, anhydrous potassium carbonate, and phosphonitrilic chloride trimer.

2. The vehicle tire rubber composite material according to claim 1, wherein:
    a method for preparing the phenyl modified natural rubber comprises the following steps:
    (1) dissolving the natural rubber in the methylene dichloride, stirring for 1-3 hours under a nitrogen atmosphere at 29-31° C., then adding the N-bromosuccinimide, continually stirring at 29-31° C. for 2-4 hours, then adding the methanol to coagulate a first product, and drying under pressure less than 1 atm (atmospheric pressure) to obtain a brominated natural rubber; and
    (2) dissolving the brominated natural rubber in the tetrahydrofuran, stirring for 1-3 hours under a nitrogen atmosphere at room temperature, then adding the phenylboronic acid or p-tolylboronic acid and adding an aqueous solution of the potassium hydroxide and the palladium catalyst, refluxing and reacting for 5-10 hours, adding the methanol to coagulate a second product, and then drying under pressure less than 1 atm to obtain the phenyl modified natural rubber.

3. The vehicle tire rubber composite material according to claim 2, wherein a mass ratio of the natural rubber, the methylene dichloride, and the N-bromosuccinimide in the step (1) is 1-5: 95-100: 2-6.

4. The vehicle tire rubber composite material according to claim 2, wherein a mass ratio of the brominated natural rubber, the tetrahydrofuran, the phenylboronic acid or the p-tolylboronic acid, the potassium hydroxide, and the palladium catalyst in the step (2) is 1-4: 95-100: 0.1-0.5: 6-10: 0.006-0.01.

5. The vehicle tire rubber composite material according to claim 1, wherein:
    a method for preparing the multifunctional abrasion-resistant flame retardant comprising the copper modified halloysite nanotubes coated with PZE modified $MoS_2$ comprises the following steps:
    (1) dissolving the halloysite nanotubes and the $CuSO_4 \cdot 5H_2O$ in a mixed solvent consisting of ethanol and water with a volume ratio of 20-40:2-10, then slowly dripping $Na_3C_6H_5O_7 \cdot 2H_2O$ aqueous solution to obtain a solution, continually sonicating for 2-3 hours, then adding the hydrazine hydrate, reducing at 75-85° C. for 1-2 hours, centrifuging, washing, and drying to obtain copper modified halloysite nanotubes;
    (2) sonicating to disperse the copper modified halloysite nanotubes and the $Na_2MoO_4 \cdot 2H_2O$ in distilled water, then adding the L-cysteine while stirring, then reacting at 180-200° C. for 36-48 hours, centrifuging, washing, and drying to obtain copper modified halloysite nanotubes coated with $MoS_2$; and
    (3) adding the copper modified halloysite nanotubes coated with $MoS_2$ and the eugenol into dried acetonitrile solvent, adding the anhydrous potassium carbonate, stirring, then slowly dripping an acetonitrile solution of the phosphonitrilic chloride trimer under nitrogen atmosphere, and reacting at 80-85° C. for 36-72 hours to obtain the multifunctional abrasion-resistant flame retardant comprising the copper modified halloysite nanotubes coated with PZE modified $MoS_2$.

6. The vehicle tire rubber composite material according to claim 5, wherein a ratio of the halloysite nanotubes, the $CuSO_4 \cdot 5H_2O$, the $Na_3C_6H_5O_7 \cdot 2H_2O$, and the hydrazine hydrate in the step (1) is 60 mg-120 mg: 10 mg-30 mg: 70 mg-100 mg: 2 mL-4 mL.

7. The vehicle tire rubber composite material according to claim 5, wherein a mass ratio of the copper modified halloysite nanotubes, the $Na_2MoO_4 \cdot 2H_2O$, and the L-cysteine in the step (2) is 0.1-0.3: 0.5-0.9: 2-4.

8. The vehicle tire rubber composite material according to claim 5, wherein a mass ratio of the copper modified halloysite nanotubes coated with $MoS_2$, the eugenol, and the anhydrous potassium carbonate in the step (3) is 1-3: 3-5: 2-5.

9. The vehicle tire rubber composite material according to claim 1, wherein the elastic fiber is at least one of elastic polyethylene fiber, silk, or polyurethane fiber.

10. A vehicle tire, wherein the vehicle tire is made of raw materials comprising the vehicle tire rubber composite material according to claim 1.

* * * * *